(12) United States Patent
Guthrie et al.

(10) Patent No.: US 9,418,007 B2
(45) Date of Patent: Aug. 16, 2016

(54) MANAGING MEMORY TRANSACTIONS IN A DISTRIBUTED SHARED MEMORY SYSTEM SUPPORTING CACHING ABOVE A POINT OF COHERENCY

(71) Applicant: INTERNATIONAL BUSINESS MACHINES CORPORATION, Armonk, NY (US)

(72) Inventors: Guy L. Guthrie, Austin, TX (US); Hugh Shen, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 14/278,005

(22) Filed: May 15, 2014

(65) Prior Publication Data
US 2015/0331798 A1 Nov. 19, 2015

(51) Int. Cl.
*G06F 12/08* (2016.01)

(52) U.S. Cl.
CPC ............ *G06F 12/08* (2013.01); *G06F 12/0811* (2013.01); *G06F 12/0828* (2013.01); *G06F 12/0833* (2013.01); *G06F 2212/283* (2013.01); *G06F 2212/62* (2013.01)

(58) Field of Classification Search
CPC ............ G06F 12/0811; G06F 12/0897; G06F 12/0802; G06F 12/0815; G06F 12/084; G06F 12/0808; G06F 2212/283; G06F 12/0833; G06F 2212/62; G06F 12/0828; G06F 9/467; G06F 12/0891
USPC .......................... 711/122, 141, 144, 146, 147
See application file for complete search history.

(56) References Cited

U.S. PATENT DOCUMENTS

| | | | |
|---|---|---|---|
| 7,676,636 B2 | 3/2010 | Cypher et al. | |
| 8,051,248 B2 * | 11/2011 | Frank ..................... | G06F 9/3004 711/120 |
| 8,074,030 B1 | 12/2011 | Moir et al. | |
| 2012/0179877 A1 | 7/2012 | Shriraman et al. | |
| 2013/0326153 A1 | 12/2013 | Rozas | |
| 2014/0006698 A1 | 1/2014 | Chappell et al. | |
| 2014/0047195 A1 | 2/2014 | Frey et al. | |

OTHER PUBLICATIONS

Guy L. Guthrie, "Managing Memory Transactions in a Distributed Shared Memory System Supporting Caching Above a Point of Coherency", U.S. Appl. No. 14/312,157, filed Jun. 23, 2014, Non-Final Office Action dated Nov. 9, 2015.
Guy L. Guthrie, "Managing Memory Transactions in a Distributed Shared Memory System Supporting Caching Above a Point of Coherency", U.S. Appl. No. 14/312,157, filed Jun. 23, 2014, Notice of Allowance dated Apr. 25, 2016.

* cited by examiner

*Primary Examiner* — Jasmine Song
(74) *Attorney, Agent, or Firm* — Brian F. Russell; Steven L. Bennett

(57) ABSTRACT

In response to execution in a memory transaction of a transactional load instruction that speculatively binds to a value held in a store-through upper level cache, a processor core sets a flag, transmits a transactional load operation to a store-in lower level cache that tracks a target cache line address of a target cache line containing the value, monitors, during a core TM tracking interval, the target cache line address for invalidation messages from the store-in lower level cache until the store-in lower level cache signals that the store-in lower level cache has assumed responsibility for tracking the target cache line address, and responsive to receipt during the core TM tracking interval of an invalidation message indicating presence of a conflicting snooped operation, resets the flag. At termination of the memory transaction, the processor core fails the memory transaction responsive to the flag being reset.

14 Claims, 10 Drawing Sheets

Figure 5A

Processor Core 0
st A, 1 — 500

Processor Core 1
ld A — 510
SYNC — 512
st B, 1 — 514

Processor Core 2
ld B — 520
SYNC — 522
ld A — 524

Figure 5B

Processor Core 0
⎰ tbegin — 532
⎱ st A, 1 — 534   } 530
  tend — 536

Processor Core 1
⎰ tbegin
⎱ ld A — 542   } 540
  st B, 1
  tend

Processor Core 2
⎰ tbegin — 552
⎱ ld B — 554   } 550
  ld A
  tend

Figure 5C

Processor Core 0
st A, 1 — 560

Processor Core 1
⎰ tbegin
⎱ ld A — 570
572 — st B, 1
574 — tend
576

Processor Core 2
ld B — 580
SYNC — 582
ld A — 584

MANAGING MEMORY TRANSACTIONS IN A DISTRIBUTED SHARED MEMORY SYSTEM SUPPORTING CACHING ABOVE A POINT OF COHERENCY

BACKGROUND OF THE INVENTION

The present invention relates generally to data processing and, in particular, to memory transactions in a distributed shared memory system of a data processing system.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then accesses lower-level caches (e.g., level two (L2) or level three (L3) caches) or system memory for the requested memory block. The lowest level cache (e.g., L3 cache) is often shared among several processor cores.

In such systems, multiprocessor software concurrently accesses shared data structures from multiple software threads. When concurrently accessing shared data it is typically necessary to prevent so-called "unconstrained races" or "conflicts". A conflict occurs between two memory accesses when they are to the same memory location and at least one of them is a write and there is no means to ensure the ordering in which those accesses occur.

Multiprocessor software typically utilizes lock variables to coordinate the concurrent reading and modifying of locations in memory in an orderly conflict-free fashion. A lock variable is a location in memory that is read and then set to a certain value, possibly based on the value read, in an atomic fashion. The read-modify-write operation on a lock variable is often accomplished utilizing an atomic-read-modify-write (ARMW) instruction or by a sequence of instructions that provide the same effect as a single instruction that atomically reads and modifies the lock variable.

In this manner, a software thread reading an initial "unlocked" value via an ARMW instruction is said to have "acquired" the lock and will, until it releases the lock, be the only software thread that holds the lock. The thread holding the lock may safely update the shared memory locations protected by the lock without conflict with other threads because the other threads cannot obtain the lock until the current thread releases the lock. When the shared locations have been read and/or modified appropriately, the thread holding the lock releases the lock (e.g., by writing the lock variable to the "unlocked" value) to allow other threads to access the shared locations in storage.

While locking coordinates competing threads' accesses to shared data, locking suffers from a number of well known shortcomings. These include, among others, (1) the possibility of deadlock when a given thread holds more than one lock and prevents the forward progress of other threads and (2) the performance cost of lock acquisition when the lock may not have been strictly necessary because no conflicting accesses would have occurred to the shared data.

To overcome these limitations, the notion of transactional memory can be employed. In transactional memory, a set of load and/or store instructions are treated as a "memory transaction" (also referred to herein simply as a "transaction.") A transaction succeeds when the constituent load and store operations can occur atomically without a conflict with another thread. The transaction fails in the presence of a conflict with another thread and can then be re-attempted. If a transaction continues to fail, software may fall back to using locking to ensure the orderly access of shared data.

To support transactional memory, the underlying hardware tracks the storage locations involved in the transaction—the transaction footprint—as the transaction executes for conflicts. If a conflict occurs in the transaction footprint, the transaction is aborted and possibly restarted. Use of transactional memory reduces the possibility of deadlock due to a thread holding multiple locks because, in the typical case, no locks are held (the transaction simply attempts to make one or more storage accesses and restarts if a conflict occurs). Further, the processing overhead of acquiring a lock is generally avoided.

BRIEF SUMMARY

According to one embodiment, a processing unit for a multiprocessor data processing system includes a processor core including a store-through upper level cache, an instruction execution unit, and a flag. In response to execution in a memory transaction of a transactional load instruction that speculatively binds to a value held in the store-through upper level cache, the processor core sets the flag, transmits a transactional load operation to a store-in lower level cache that tracks a target cache line address of a target cache line containing the value, monitors, during a core TM tracking interval, the target cache line address for invalidation messages from the store-in lower level cache until the store-in lower level cache signals that the store-in lower level cache has assumed responsibility for tracking the target cache line address, and responsive to receipt during the core TM tracking interval of an invalidation message indicating presence of a conflicting snooped operation, resets the flag. At termination of the memory transaction, the processor core fails the memory transaction responsive to the flag being reset.

BRIEF DESCRIPTION OF THE SEVERAL VIEWS OF THE DRAWINGS

FIG. 5A depicts execution of an exemplary program illustrating causality in a multiprocessor data processing system;

FIG. 5B illustrates execution of an exemplary program including memory transactions to ensure causality;

FIG. 5C depicts execution of an exemplary program including both transactional and non-transactional memory accesses;

DETAILED DESCRIPTION

Figure 1:
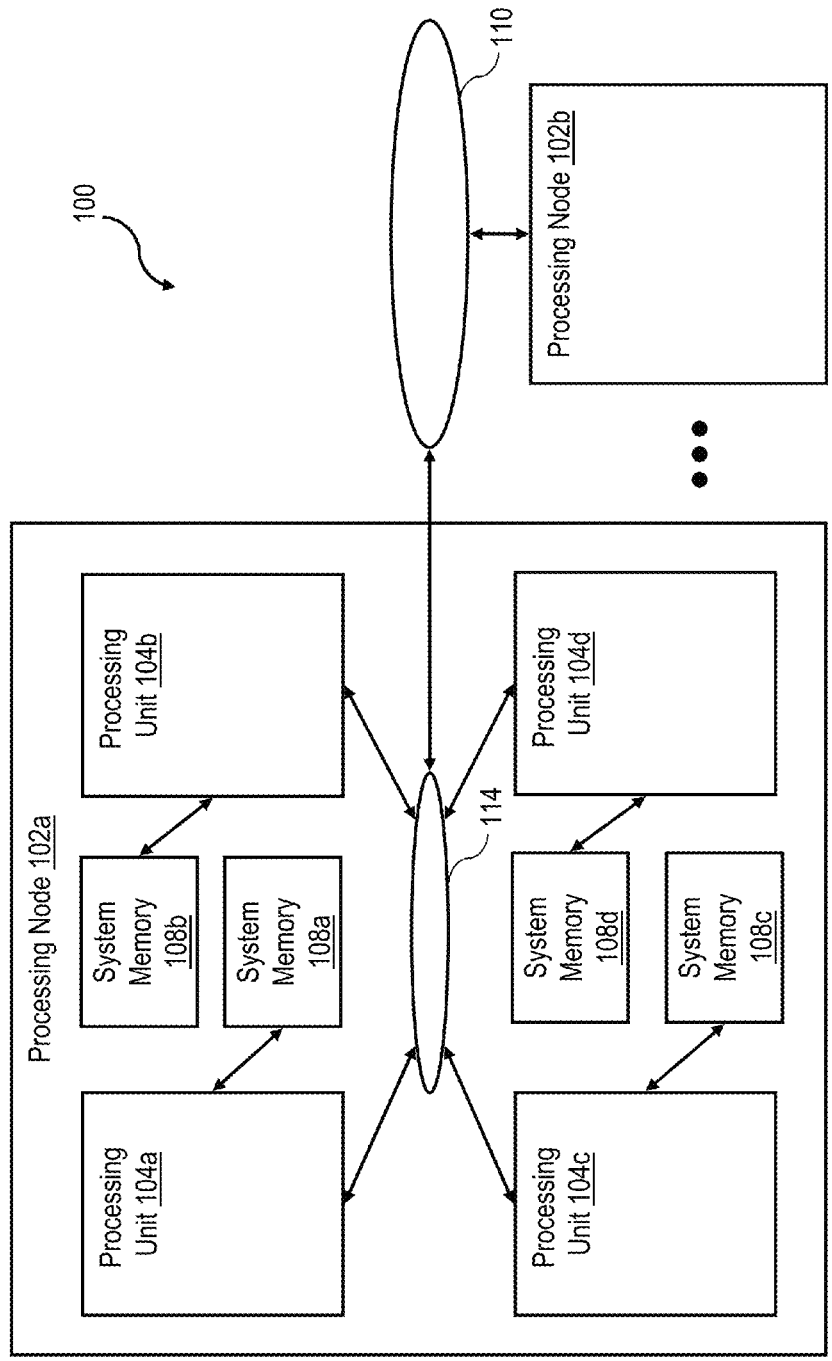
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of volatile storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing systems such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: (1) ordering of memory access operations and (2) atomicity of store operations.

The ordering of memory operations specifies how memory operations may, if at all, be re-ordered relative to the order of their respective load and store instructions in the individual threads of execution in the multiprocessor program. Memory consistency models must define ordering of memory access operations in four general cases: (1) ordering of the memory operations for a load instruction to a following load instruction, (2) ordering of the memory operations for a load instruction to a following store instruction, (3) ordering of the memory operations for a store instruction to a following store instruction, and (4) ordering of the memory operations for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store operations refers to whether or not a given thread of execution can read the value of its own store operation before other threads, and furthermore, whether the value written to the distributed shared memory system by the store operation becomes visible to other threads in a logically instantaneous fashion or whether the value can become visible to other threads at different points in time. A memory consistency model is called "multi-copy atomic" if the value written by a store operation of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access operations are respected. Therefore, in a data processing system 100 having a distributed shared memory system that implements a weak consistency memory model, so called "barrier" (e.g., SYNC) instructions are typically provided to allow the programmer to specify what memory access operation orderings and atomicity are to be applied during execution of the multiprocessor program.

Figure 2:
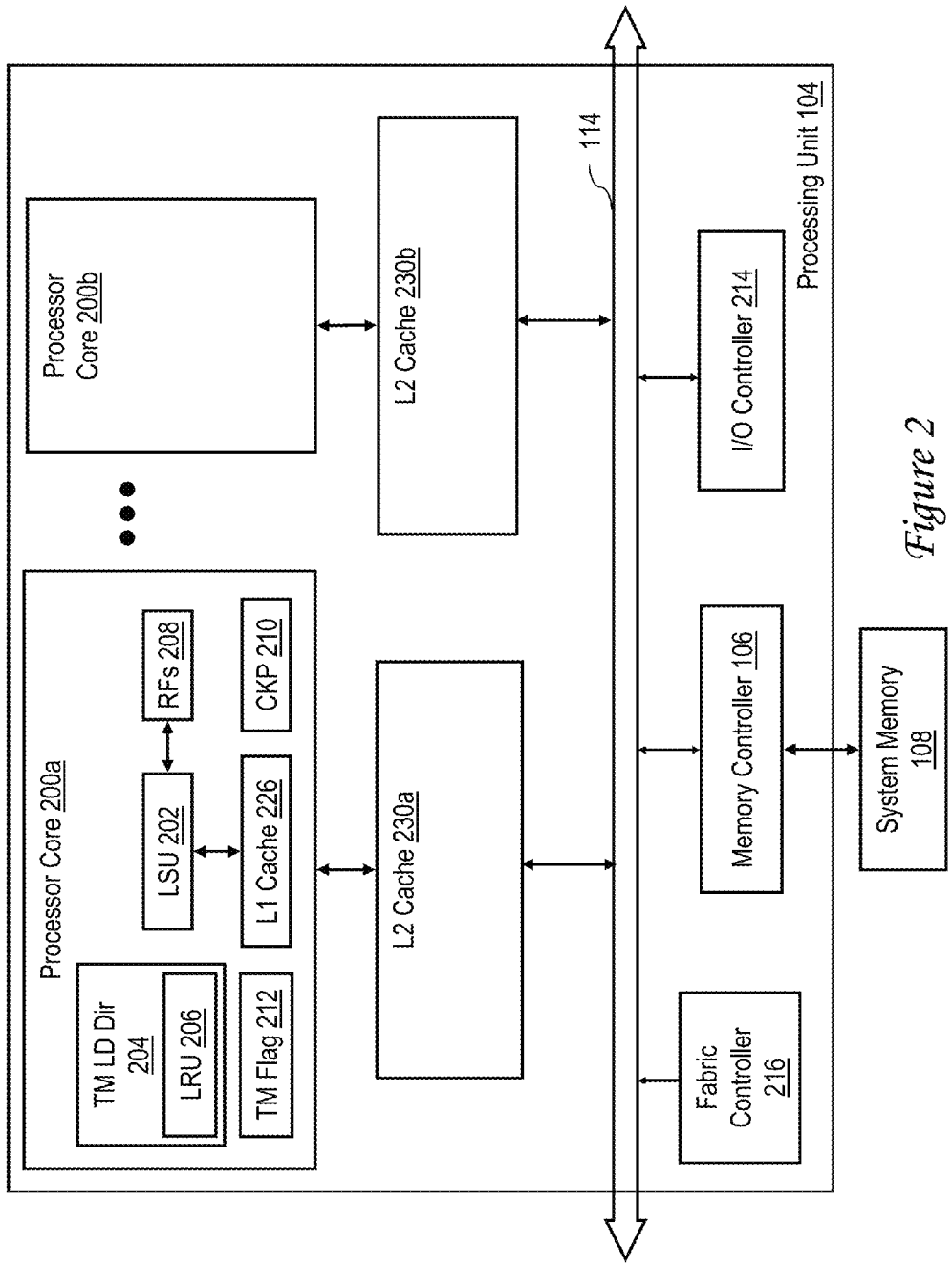
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In a preferred embodiment, each processor core 200 is capable of independently executing multiple hardware threads of execution simultaneously. However, in the following description, unless the interaction between threads executing on a same processor core is relevant in a particular context, for simplicity, terms "processor core" and "thread executing on a processor core" are used interchangeably. As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208.

The operation of each processor core 200 is supported by a multi-level volatile memory hierarchy having at its lowest level a shared system memory 108 accessed via an integrated memory controller 106, and at its upper levels, one or more levels of cache memory, which in the illustrative embodiment include a store-through level one (L1) cache 226 within and private to each processor core 200, and a respective store-in level two (L2) cache 230 for each processor core 200a, 200b. In order to efficiently handle multiple concurrent memory access requests to cacheable addresses, each L2 cache 230 can be implemented with multiple L2 cache slices, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access instruction requesting a specified memory access operation to be performed, LSU 202 executes the memory access instruction to determine the target address (e.g., an effective address) of the memory access operation. After translation of the target address to a real address, L1 cache 226 is accessed utilizing the target address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 230 for servicing.

Figure 3:
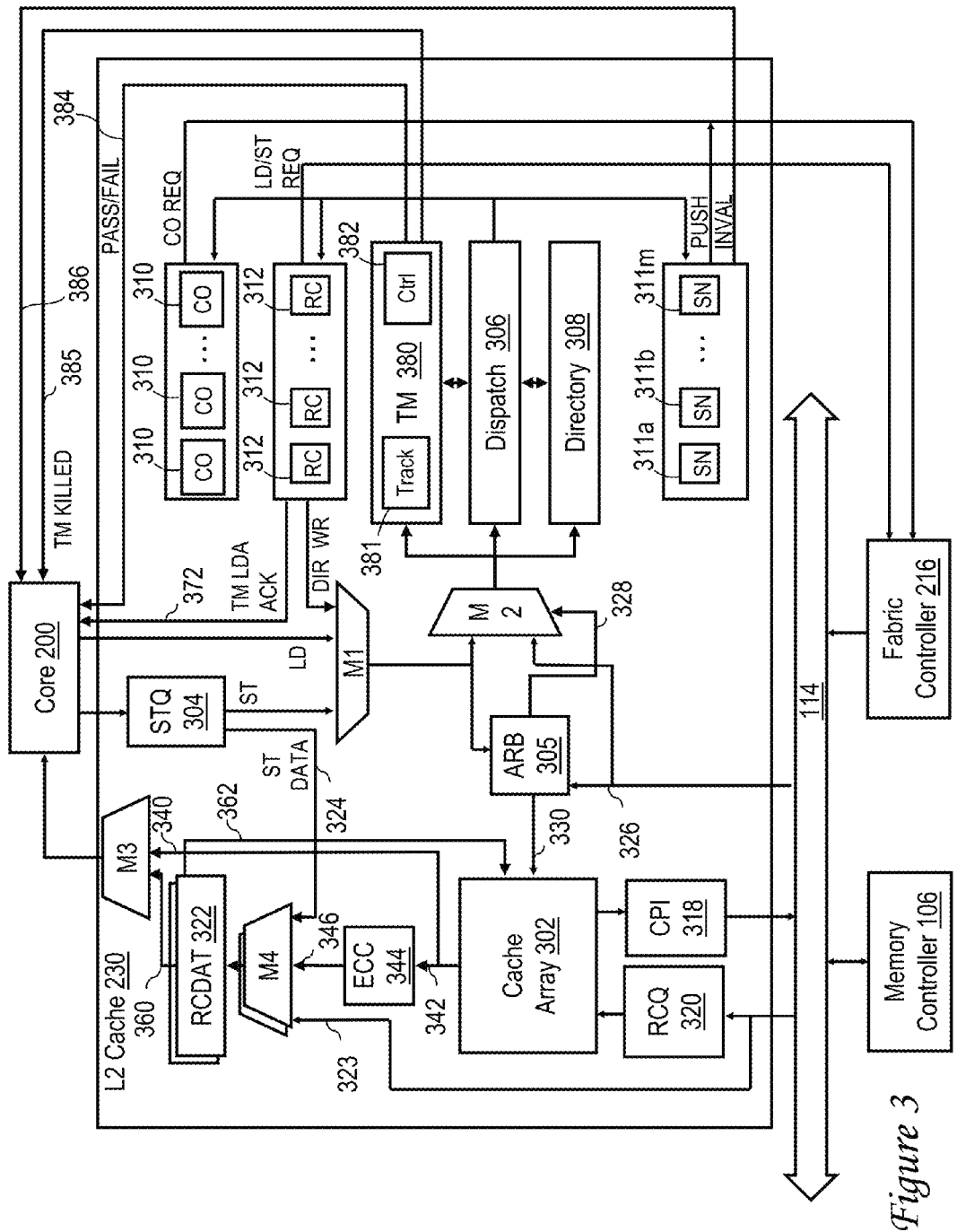
FIG. 3 is a detailed block diagram of lower level cache memory supporting memory transactions in accordance with one embodiment.

With reference now to FIG. 3, there is illustrated a more detailed block diagram of an exemplary embodiment of a lower level cache (e.g., an L2 cache 230) that supports memory transactions in accordance with one embodiment. As shown in FIG. 3, L2 cache 230 includes a cache array 302 and a directory 308 of the contents of cache array 302. Although not explicitly illustrated, cache array 302 preferably is implemented with a single read port and single write port to reduce the die area required to implement cache array 302.

Assuming cache array 302 and directory 308 are set associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicates the coherency state of the cache line, an LRU (Least Recently Used) field indicating a replacement order for the cache line with respect to other cache lines in the same congruence class, and inclusivity bits indicating whether the memory block is held in the associated L1 cache 226.

L2 cache 230 includes multiple (e.g., 16) Read-Claim (RC) machines 312 for independently and concurrently servicing load (LD) and store (ST) requests received from the affiliated processor core 200. In order to service remote memory access requests originating from processor cores 200 other than the affiliated processor core 200, L2 cache 230 also includes multiple snoop machines 311. Each snoop machine 311 can independently and concurrently handle a remote memory access request "snooped" from local interconnect 114. As will be appreciated, the servicing of memory access requests by RC machines 312 may require the replacement or invalidation of memory blocks within cache array 302 (and L1 cache 226). Accordingly, L2 cache 230 also includes CO (castout) machines 310 that manage the removal and writeback of memory blocks from cache array 302.

L2 cache 230 further includes an arbiter 305 that controls multiplexers M1-M2 to order the processing of local memory access requests and memory transaction requests (corresponding to the tbegin and tend instructions described further herein) received from the affiliated processor core 200 and remote requests snooped on local interconnect 114. Such requests, including local load and store and memory transaction requests and remote load and store requests, are forwarded in accordance with the arbitration policy implemented by arbiter 305 to dispatch logic, such as a dispatch pipeline 306, which processes each read/load and store request with respect to directory 308 and cache array 302. As described further below, transactional memory (TM) logic 380 processes memory transaction requests and tracks memory access operations within memory transactions to ensure completion of the memory access operations in an atomic manner or to abort the memory transactions in the presence of conflicts.

L2 cache 230 also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that each CO machine 310 and each snooper 311 that is dispatched retrieves data from only the respective designated CPI buffer entry.

Each RC machine 312 also has assigned to it a respective one of multiple RC data (RCDAT) buffers 322 for buffering a memory block read from cache array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, a processor core 200 transmits store requests comprising a transaction type (ttype), target real address and store data to a store queue (STQ) 304. From STQ 304, the store data are transmitted to store data multiplexer M4 via data path 324, and the transaction type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

The request selected for processing by arbiter 305 is placed by multiplexer M2 into dispatch pipeline 306. Dispatch pipeline 306 preferably is implemented as a fixed duration pipeline in which each of multiple possible overlapping requests is processed for a predetermined number of clock cycles (e.g., 4 cycles). During the first cycle of processing within dispatch pipeline 306, a directory read is performed utilizing the request address to determine if the request address hits or misses in directory 308, and if the memory address hits, the coherency state of the target memory block. The directory information, which includes a hit/miss indication and the coherency state of the memory block, is returned by directory 308 to dispatch pipeline 306 in a subsequent cycle. As will be appreciated, no action is generally taken within an L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 104, may entail communication on local interconnect 114 via fabric controller 216.

At a predetermined time during processing of the memory access request within dispatch pipeline 306, arbiter 305 transmits the request address to cache array 302 via address and control path 330 to initiate a cache read of the memory block specified by the request address. The memory block read from cache array 302 is transmitted via data path 342 to Error Correcting Code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 makes a dispatch determination based upon a number of criteria, including (1) the presence of an address collision between the request address and a previous request address currently being processed by a castout machine 310, snoop machine 311 or RC machine 312, (2) the directory information, and (3) availability of an RC machine 312 or snoop machine 311 to process the memory access request. If dispatch pipeline 306 makes a dispatch determination that the memory access request is to be dispatched, the memory access request is dispatched from dispatch pipeline 306 to an RC machine 312 or a snoop machine 311. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of directory 308, if necessary. In addition, the RC machine 312 may perform a cache write to update the relevant cache line of cache array 302. Directory writes and cache writes may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state.

Associated with RC machines 312 is data handling circuitry, different portions of which are employed during the servicing of various types of local memory access requests. For example, for a local load request that hits in directory 308, an uncorrected copy of the target memory block is forwarded from cache array 302 to the affiliated processor core 200 via data path 340 and load data multiplexer M3 and additionally forwarded to ECC logic 344 via data path 342. In the case of an ECC error in the target memory block obtained by the local load request, corrected data is forwarded to RCDAT buffer 322 via data path 346 and store data multiplexer M4 and then from RCDAT 322 to affiliated processor core 200 via data path 360 and load data multiplexer M3. For a local store request, store data is received within RCDAT buffer 322 from STQ 304 via data path 324 and store data multiplexer M4, the store is merged with the memory block read into RCDAT buffer 322 from cache array 302 via ECC logic 344 and store data multiplexer M4, and the merged store data is then written from RCDAT buffer 322 into cache array 302 via data path 362. In response to a local load miss or local store miss, the target memory block acquired through issuing a memory access operation on local interconnect 114 is loaded into cache array 302 via reload bus 323, store data multiplexer M4, RCDAT buffer 322 (with store merge for a store miss) and data path 362.

Figures 4A, 4B:
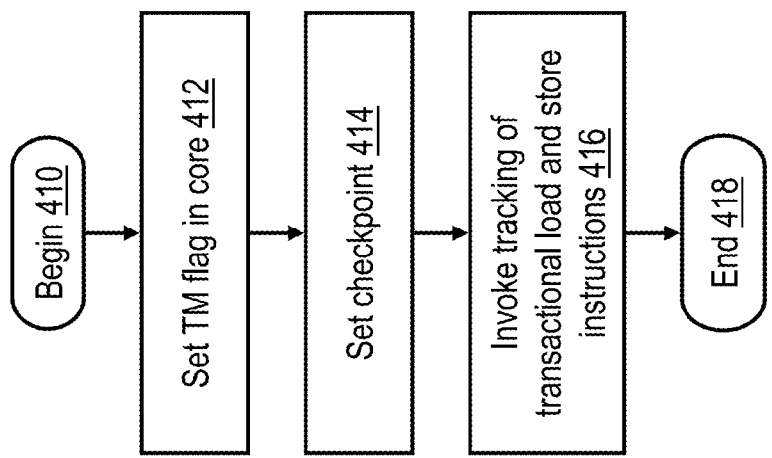
FIG. 4A is an illustrative example of a memory transaction in accordance with one embodiment.
FIG. 4B is a high level logical flowchart of an exemplary method by which a multiprocessor data processing system executes an instruction initiating a memory transaction in accordance with one embodiment.

Referring now to FIG. 4A, an illustrative example of a memory transaction is depicted. Those skilled in the art will recognize that the particular semantics and instructions utilized to implement the various memory transactions described herein are but some of the numerous possible implementations and that the disclosed techniques of implementing transactional memory are not dependent on the specific instructions and instruction semantics employed.

Illustrative memory transaction 400 includes a tbegin instruction 402 that initiates transactional processing, a transaction body 406 including one or more memory access instructions that are to be performed atomically (and optionally one or more additional unillustrated instructions), and a tend instruction 408 that terminates transactional processing. Memory transaction 400 additionally includes a branch instruction 404 immediately following tbegin instruction 402. When memory transaction 400 first executes, the condition code register in processor core 200 upon which branch instruction 404 depends is initialized to a value that causes the program branch indicated by branch instruction 404 not to be taken and the flow of execution to continue to transaction body 406. As discussed below, in response to failure of memory transaction 400, as determined, for example, prior to or at the processing of the tend instruction 408, the condition code register is set to a different value, and branch instruction 404 causes execution to branch to a fail handler routine.

FIG. 4B shows an exemplary process by a processor core 200 processes a tbegin instruction 402 of a memory transaction 400 in accordance with one embodiment. The exemplary method begins at block 410 and then proceeds to block 412, which illustrates the processor core 200 that is executing tbegin instruction 402 setting a TM flag 212 in processor core 200 to indicate that the processor core 200 is currently executing a memory transaction 400 that has not yet failed (block 412). In addition, the processor core 200 takes a checkpoint 210 of the architected register state of processor core 200, which can be utilized to restore the state of processor core 200 in the event memory transaction 400 fails (block 414). Further, the processor core 200 invokes tracking of load and store instructions within the transaction body 406 (referred to herein as "transactional load" and "transactional store" instructions) to ensure they complete in an atomic fashion or that memory transaction 400 fails in the presence of a conflict (block 416). Processor core 200 can invoke tracking of the transactional memory accesses of transaction body 406, for example, by transmitting a corresponding TBEGIN request to the affiliated L2 cache 230. Thereafter, the processing of the tbegin instruction 402 ends at block 418 of FIG. 4B.

In the exemplary embodiment of a lower level cache memory depicted in FIG. 3, tracking of transactional memory access (e.g., load and store) instructions within transaction body 406 to ensure that they complete in an atomic fashion (or that memory transaction 400 fails in the presence of a conflict) is performed by TM logic 380 of L2 cache 230. In particular, TM tracking logic 381 within TM logic 380 includes a number of entries that indicate which cache lines in cache array 302 of L2 cache 230 are included in the transaction footprint. The transaction footprint includes two portions: the load footprint corresponding to cache lines touched solely by loads within transaction body 406 (e.g., the cache line at address A in exemplary memory transaction 400) and the store footprint corresponding to cache lines touched solely by store instructions or by both load and store instructions in transaction body 406 (e.g., the cache line at address B in exemplary memory transaction 400).

As further shown in FIG. 3, TM logic 380 further includes transactional control logic 382, which controls the sequencing of a memory transaction and provides a pass/fail indication 384 and an optional TM killed indication 385 to the associated processor core 200. Pass/fail indication 384 indicates to processor core 200 whether or not the memory transaction successfully committed to the distributed shared memory system at the execution of the tend instruction 408 at the end of memory transaction 400. TM killed indication 385 indicates to processor core 200 whether or not a conflict has occurred during the transaction. In response to transactional control logic 382 asserting TM killed indication 385, processor core 200 may, as a performance optimization, optionally abort and restart memory transaction 400 prior to reaching tend instruction 408.

In response to pass/fail indication 384 (or optionally TM killed indication 385) indicating that a conflict has occurred during execution of memory transaction 400, processor core 200 re-establishes its architected register state from the checkpoint 210 taken at the execution of tbegin instruction 402, invalidates the tentatively modified cache lines in the store footprint, clears TM tracking logic 381, sets the condition code register such that branch instruction 404 will be taken, and transfers control to branch instruction 404. In addition, processor core 200 sets a transaction failure cause register (not shown) in processor core 200 to indicate the cause of the memory transaction's failure. The fail handler routine invoked by branch instruction 404 may choose to re-attempt memory transaction 400 or fall back to more conventional locking mechanisms, optionally based on the content of the transaction failure cause register.

During the execution of a memory transaction, the values stored to the distributed shared memory system by transaction body 406 (i.e., those in the store footprint of the memory transaction) are visible only to the thread of the processor core 200 executing the memory transaction. Threads running on the same or other processor cores 200 will not see these values until and only if the memory transaction successfully commits.

For a memory transaction to successfully commit, the transactional load and store instructions in transaction body 406 must complete in an atomic fashion (i.e., there must be no conflicts for the cache lines in the memory transaction's load and store footprints) and the effects of the store instructions in transaction body 406 must propagate to all processing units 104 in data processing system 100 and invalidate any cached copies of those cache lines held in other processing units 104. If both of these conditions hold when tend instruction 408 is executed, transactional control logic 382 indicates to processor core 200 via pass/fail indication 384 that memory transaction 400 passed and commits all stores performed in transaction body 406 to L2 cache 230, thus making them visible to all other threads and processor cores 200 in the system simultaneously.

In the following discussion, a load or store instruction will be called "transactional" if that load or store instruction occurs within the transaction body 406 of a memory transaction 400. Similarly, a load or store will be called "non-transactional" if it occurs outside a transaction body 406. In one exemplary embodiment, a conflict policy of data processing system 100 defines a conflict with another processor core's memory access to occur for a given memory transaction in any one of several possible cases. In a first case, a conflict occurs if a non-transactional store from another processor core 200 hits a cache line within either the given memory transaction's load or store footprint. In a second case, a conflict occurs if a transactional store from another processor core 200 hits a cache line within the given memory transaction's load footprint. In a third case, a conflict occurs if a non-transactional load hits a cache line within the given memory transaction's store footprint. In a fourth case, a conflict occurs if a transactional load from another processor core 200 hits a cache line within the given memory transaction's store footprint. In addition, the given memory transaction has a conflict if one of its transactional stores hits an address already extant in the store footprint of another processor core's memory transaction. This exemplary conflict policy is but one of several possible embodiments of transactional memory. The above conflict policy biases in favor of transactional stores over transactional loads, while allowing transactional and non-transactional loads to freely intermingle.

Referring now to FIG. 5A, the execution of an exemplary program illustrating the property of causality in a multiprocessor data processing system is shown. As used herein "causality," which is desirable property in multiprocessor programs, is defined as being preserved if, during execution of a multiprocessor program, a given thread of execution cannot read the effects of a computation before the writes that caused the computation can be read by the given thread.

In the simplified example given in FIG. 5A (as well as those discussed below with reference to FIGS. 5B-5C), a multiprocessor program is executed by three processor cores 200 of data processing system 100, labeled for ease of reference as processor core 0, processor core 1 and processor core 2. In FIG. 5A, processor core 0 executes a store instruction 500 that writes a value of 1 to address A in the distributed shared memory system. This update of address A propagates to processor core 1, and load instruction 510 executed by processor core 1 therefore returns a value of 1. Even though the memory update made by store instruction 500 has propagated to processor core 1, that memory update may not yet have propagated to processor core 2. If store instruction 514 executes on processor 1 and the associated memory update propagates to processor 2 before the memory update of store instruction 500 propagates to processor 2, causality would be violated because the store of the value of 1 to address B, which is an effect of the store to address A, would be visible to processor core 2 before the memory update associated with causal store instruction 500 was visible to processor core 2.

To ensure causality in a weak consistency memory model, barrier instruction 512 (e.g., a SYNC) ensures that store instruction 514 does not take effect or begin propagating its memory update to other processor cores until load instruction 510 has bound to its value. In addition, barrier instruction 512 also ensures that the memory update associated with store instruction 500 propagates to processor 2 before the memory update associated with store instruction 514. Thus, causality is preserved because the cause of the computation (i.e., the memory update of store instruction 500) is visible to processor core 2 before the result of the computation (i.e., the memory update of store 514). A barrier instruction 522 is also executed by processor core 2 to ensure that processor core 2 executes load instructions 520 and 524 and binds their values in order, thus guaranteeing that processor core 2 properly observes the memory updates made by processor core 0 and processor core 1.

With reference now to FIG. 5B, an exemplary embodiment of the multiprocessor program of FIG. 5A rendered in terms of memory transactions is illustrated. In FIG. 5B, the branch instructions to the memory transaction fail handler are omitted for clarity.

As illustrated, processor core 0 executes a memory transaction 530 including a tbegin instruction 532, tend instruction 536, and a transaction body including a store instruction 534 that stores a value of 1 to address A. Upon the execution of tend instruction 536, memory transaction 500 successfully commits and makes the update to address A visible to all the other processor cores simultaneously. In particular, by the time load instruction 542 of the memory transaction 540 executing on processor core 1 can read the value of 1 from address A, load instruction 554 of the memory transaction 550 executing on processor core 2 must also be able to read the value of 1 for address A. Memory transaction 540 then reads the value of 1 for address A, stores a value of 1 to address B and successfully commits. Finally, load instruction 552 of memory transaction 550 reads a value of 1 for address B, and given that memory transaction 540 read a value of 1 for A, load instruction 554 must also read a value of 1 for address A.

In order to make the memory updates of store instructions in a successful transaction visible to all other processor cores simultaneously, before that memory transaction can commit all the cache line invalidates necessitated by the memory transaction must have propagated through the data processing system such that any other processor cores' now stale copies of the updated cache lines have been removed (e.g., invalidated) and can no longer be read by the other processor cores. Without this requirement, a processor core could still read a stale value for an updated memory location after the memory transaction that updated the memory location committed. A processor core, therefore, needs to ensure that the memory updates associated with its own transactional stores are fully propagated through the data processing system to invalidate any stale cached copies before committing a successful memory transaction in order to maintain the semantics of memory transactions. As a consequence of the propagation of the memory updates inherent in the semantics of memory transactions, causality is trivially preserved when only memory transactions are utilized to access memory locations in a distributed shared memory system. However, when transactional and non-transactional code interact on the same shared variables, causality is not directly preserved by ensuring that the memory updates made by a memory transaction are visible simultaneously to all other processor cores.

Referring now to FIG. 5C, an illustrative multiprocessor program is depicted that includes a mixture of transactional and non-transactional accesses to a distributed shared memory system. In the exemplary multiprocessor program, processor core 0 executes a non-transactional store instruction 560 that unconditionally writes a value of 1 to address A in the distributed shared memory system. This value propagates to processor core 1 and is read by transactional load instruction 572 within the memory transaction 570 executed by processor core 1. Processor core 1 then executes a store instruction 574 within memory transaction 570 that updates the cache line associated with address B and completes invalidating any stale cached copies of the cache line associated with address B (so that no other processor core holds a copy of the now stale cache line) and successfully commits memory transaction 570 upon execution of tend instruction 576. Processor core 2 then executes load instructions 580 and 584 to read, in order, the cache lines associated with addresses B and A, respectively, based on the ordering enforced by barrier instruction 582. If transaction 570 only ensures that its own memory updates are fully propagated through the distributed shared memory system before committing, the memory update of store instruction 560 may or may not have propagated to processor core 2. Therefore, in at least some operating scenarios, processor core 2 could read a value of 1 for the cache line associated with address B and the, now stale, initial value of 0 for the cache line associated with address A, thus violating causality. The same result would be obtained if processor core 2 utilized transactional loads to read from addresses A and B, as depicted for processor 2 in FIG. 5B.

To guarantee causality, memory transaction 570 must ensure not only that its own transactional stores are propagated throughout the entire distributed shared memory system, but also that any non-transactional store that is read by a transactional load within the transaction has also propagated throughout the distributed shared memory system. (Memory updates of transactional writes that are read by the memory transaction are guaranteed to have propagated throughout the distributed shared memory system because those memory updates could not be read by transaction 570 before they were visible to the entire distributed shared memory system). To ensure that the memory updates of non-transactional stores read by memory transaction 570 are also propagated throughout the distributed shared memory system, the processing of the tend instruction 576 of memory transaction 570 must not allow commitment of memory transaction 570 until the memory update of any non-transactional store read by memory transaction 570 is propagated throughout the distributed shared memory system.

Figure 6:
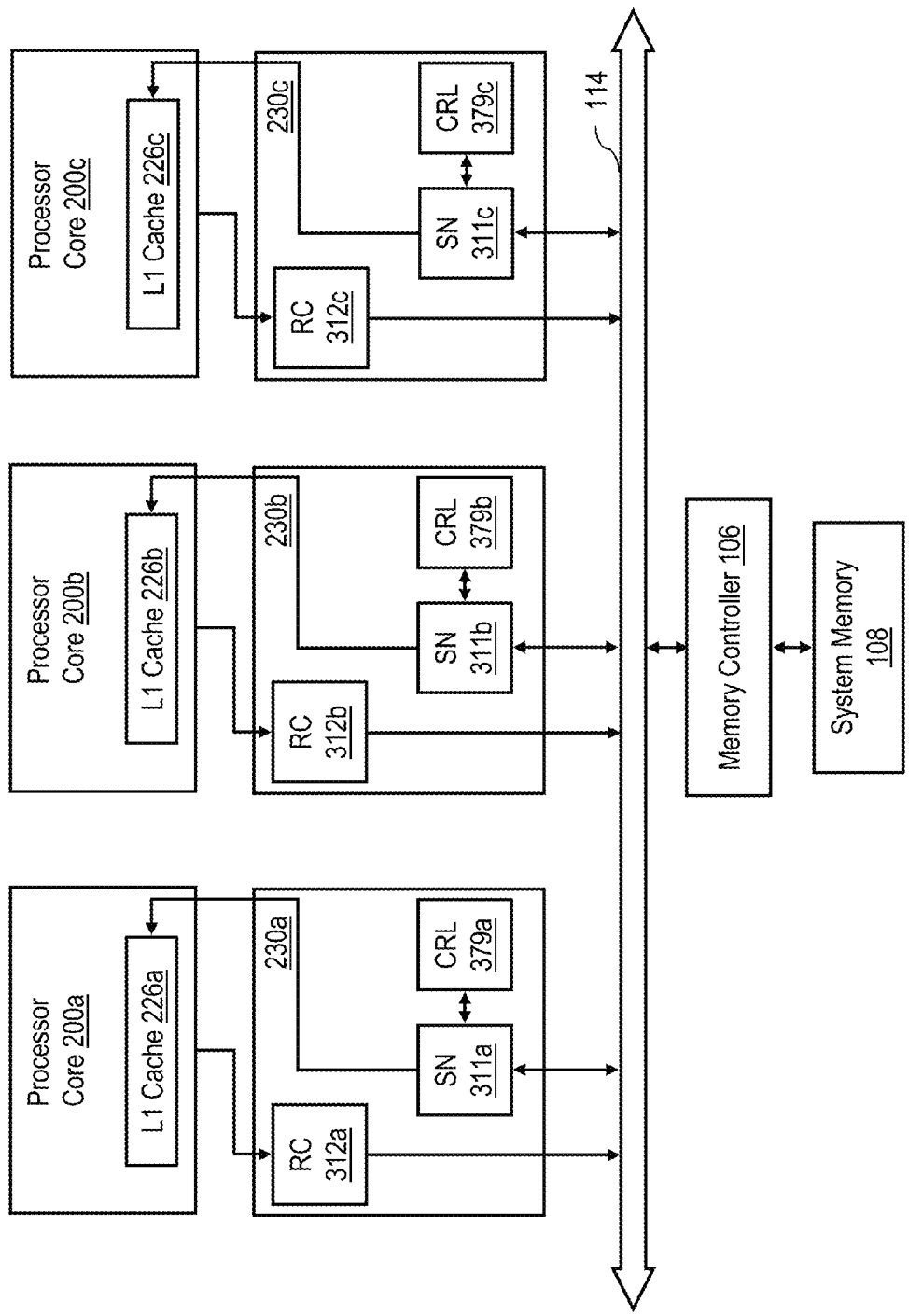
FIG. 6 illustrates a multiprocessor data processing system including at least three processor cores that execute the exemplary program of FIG. 5C.

With reference now to FIG. 6, there is illustrated a partial view of data processing system 100 of FIG. 1, which executes the multiprocessor program of FIG. 5C. In the view given in FIG. 6, processor cores 200a, 200b and 200c respectively correspond to processor cores 0, 1 and 2 of FIG. 5C. Further, an instance of causality resolution logic 379 is instantiated for and coupled to each instance of snooper 311, for example, as a component of the L2 cache 230 affiliated with each processor core 200.

Initially, processor core 200c holds a cached copy of the initial value (e.g., 0) of memory location A in its L1 cache 226c. Processor 200a begins execution of the multiprocessor program of FIG. 5C by executing store instruction 560. In response to execution of store instruction 560, processor core 200a transmits a store request to its L2 cache 230a, which allocates an RC machine 312 to service the store request. RC machine 312 broadcasts the store request onto local interconnect 114, and snoop machine 311c of the L2 cache 230c affiliated with processor core 200c registers the store request, including the processing unit that sourced the store request (i.e., the processing unit including processor core 200a). At this point, the memory update of store instruction 560 has not propagated to processor core 200c, but is instead queued for later processing, advantageously allowing processor core 200a to continue executing further instructions before the memory update of store instruction 560 is fully propagated.

Processor core 200b then executes load instruction 572 and, finding no copy of the target cache line associated with address A in its L1 cache 226b, transmits a read request to its L2 cache 230b. In response to the read request, L2 cache 230b allocates RC machine 312b to service the read request. In response to a miss of the read request in L2 cache 230b, RC machine 312b issues a read request onto local interconnect 114 to obtain the current value for address A. L2 cache 230a responds to the read request and provides the current value of address A to processor core 200b by cache-to-cache intervention. At this point a so-called "causality passing read" has occurred, that is, load instruction 572 has read the value of a store instruction that has not fully propagated through the entire distributed shared memory system. To account for this fact and to protect causality, causality resolution logic 379c in L2 cache 230c notes the successful read intervention between the vertical cache hierarchies of processor cores 200a and 200b for an address that is currently being invalidated by snoop machine 311c. In this manner causality resolution logic 379c directly tracks the causal dependency that processor 200b and its vertical cache hierarchy has on the memory update of store instruction 560 completing its propagation.

Processor 200b executes store instruction 574, which specifies an update of the value of address B to 1. In response to execution of store instruction 574, RC machine 312b issues a store request corresponding to store instruction 574 on local interconnect 114. In absence of an existing cached copy of the target cache line, memory controller 106 supplies the current value of address B from system memory 108 in response to the store request, and RC machine 312b updates L2 cache 230b accordingly. At this point processor core 1 executes tend instruction 576 to attempt to successfully commit transaction 570 and places a corresponding TEND request on local interconnect 114 to ensure that all prior memory updates by transactional stores in memory transaction 570 have been propagated throughout the distributed shared memory system and that any memory updates by non-transactional stores read by memory transaction 570 have similarly propagated throughout the distributed shared memory system. In this case, the memory update of store instruction 574 has fully propagated throughout the distributed shared memory system because no other caches held a copy of the cache line associated with address B. However, had any such copy existed and had the memory update not been fully complete, a snoop machine 311 in those caches, which noted the initial processor core 200 issuing the store, would be active and would provide a retry response to the snooped TEND request from that processor core 200 (forcing the TEND request to be reissued) until the invalidation of the cached copy of the cache line completes.

In the case at hand, the TEND request is not from the processor core 200 that initiated the store request, and therefore snoop machine 311c will not provide a retry response to the TEND request. However, causality resolution logic 379c has a causal dependency for processor 200b and its vertical cache hierarchy and issues on local interconnect 114 a retry response to the TEND request because the TEND request was issued from a processor core 200 that was the recipient of a causality passing read of the same address that snoop machine 311c is processing. In this manner, causality resolution logic 379 directly tracks which processor cores 200 have a causality dependency due to reading a memory update of a non-transactional store that was not fully completed for the processor core with which causality resolution logic 379 is associated.

It should be noted that, in general, causality resolution logic 379 must maintain a list capable of representing all the processors cores 200 in the data processing system to provide causality in cases in which the causality dependency chain passes through more than one processor core (e.g., a test where a first processor stores a location, a second processor reads that location and then stores a first flag variable, a third processor loads the first flag variable and writes a second flag in a transaction, and then a final thread reads the second flag and then the initial location). In such an implementation, a TEND request issued from any processor core with a causal dependency on the target address being invalidated by the snoop machine 311 associated with the instance of causality resolution logic 379 is retried. In a large SMP, however, such an embodiment can be prohibitive in cost and many implementations of causality resolution logic 379 only precisely track causal dependency chains of a certain fixed depth (e.g., two or three processors) and in the presence of longer dependency chains resort to pessimistically retrying all TEND requests until the cache line invalidations necessitated by the store instruction have completed processing.

To summarize, causality resolution logic is utilized to detect the occurrence of causal dependency chains, to a depth determined by the embodiment, on a pending store that has not completed processing throughout the entire distributed shared memory system. These causal dependencies are utilized to stall the completion of TEND requests from those processor cores with a causal dependency on the incomplete (pending) stores. In this manner, the memory transaction cannot complete (and therefore make its own stores visible), until the stores the memory transaction has read (i.e., those in the causal dependency chain of the memory transaction) have first completed throughout the distributed shared memory system. Only after these stores in the memory transaction's causal dependency chain (and the transactional stores of the memory transaction itself, though this is guaranteed by snooper 311 instead of causality resolution logic 379) have completed, may the TEND request complete, leading to the memory transaction successfully committing if no conflicts have occurred during its execution.

In other embodiments, additional causality resolution logic may be required to ensure the causality of memory operations. For example, in an implementation that contains a write-through L1 cache shared by a multithreaded processor core followed by a shared L2 store queue, it is possible for different threads (i.e., logically different processor cores from the point of view of software) to read stored values from the L1 cache before these stores have even propagated to the L2 cache, much less to the entire distributed shared memory system. In such an implementation, the tend instruction must act as a barrier for transactional stores in the given thread. This behavior ensures that the transactional stores are propagated to the system interconnect and the necessary snoop machines 311 so that the tend instruction can ensure, when trying to complete the memory transaction, that all of the cache line invalidations required by the memory transaction's stores have fully propagated. In addition, the tend instruction must act as a barrier for non-transactional stores that have been (or may have been) read by transactional loads within the transaction. In the simplest (and most common embodiment), all non-transactional stores within the shared store queue are treated as if they have come from a single thread for purposes of retrying the TEND request.

In this manner, all non-transactional stores from which any transaction has (or may have) read that have not been fully propagated are broadcast to snoop machines 311 as necessary before a TEND request for any transaction from that multithreaded processor core is presented on local interconnect 114. In such an embodiment, snoop machines 311 treat all stores coming from a given multithreaded processor core in a unified manner and will retry any TEND request, as necessary, from that given multithreaded processor core regardless of thread. In this embodiment, causality resolution logic 379 is not involved in monitoring these intra-core dependencies, but instead is utilized solely to manage causality dependencies between multithreaded processor cores.

The exact placement and details of the necessary causality resolution logic will vary with the particulars of given embodiment and will be apparent to those skilled in the art given the teachings herein. In general, at any point where a load may return the value of a store that has not fully propagated throughout the entire distributed shared memory system, a mechanism must be provided to ensure that any store with a causal dependency to a different processor core is noted and that causal dependency delays the processing of a tend instruction (or other semantic) ending a memory transaction until such time as the stores in the causal dependency chain of the memory transaction have completed propagating.

As noted above, in the exemplary distributed shared memory system depicted in FIGS. 1-3, L1 caches 226 are implemented as store-through caches, meaning that memory coherence is managed at L2 caches 230. Consequently, decisions regarding whether memory transactions should be committed to the distributed shared memory system or failed are also made at L2 caches 230. However, in certain operating scenarios, a transactional load request can hit in an L1 cache 226 and access the requested data before TM tracking logic 381 of the associated L2 cache 230 is aware of the transactional load request. Further, prior to awareness of the transactional load request by L2 cache 230, the data accessed from L1 cache 226 by the transactional load request may be rendered stale by receipt at the L2 cache 230 of a snooped operation that invalidates the data. According to a preferred embodiment, responsibility for detecting such accesses to stale data in L1 caches 226 is accordingly handled by processor cores 200 during a core TM tracking interval that begins when the transactional load hits in L2 cache 226 and ends when the target cache line address of the transactional load request is registered with the lower level cache forming the point of coherency (e.g., L2 cache 230) and is thereafter handled by the lower level cache (e.g., via TM tracking logic 381).

As described in greater detail below, in one embodiment, a processor core 200 notifies the associated L2 cache 230 that a transactional load request has accessed data from L1 cache 226 by issuing a special informational TM load request (referred to herein as a TM LDA request) that registers the target cache line address of the transactional load request with L2 cache 230 as part of the transaction footprint, but does not request any return data. In the core TM tracking interval, processor core 200 is responsible for determining whether or not the value accessed from L1 cache 226 has been corrupted by an invalidation message sent by the associated L2 cache 230 and for recording any such data corruption by resetting TM flag 212. In response to registration of the target cache line address of the transactional load request in L2 cache 230 (e.g., in TM tracking logic 381), L2 cache 230 informs processor core 200 that its responsibility for tracking (and the core TM tracking interval) has ended by sending a TM LDA Ack message confirming registration of the target cache line address of the TM LDA request with L2 cache 230.

Once the target cache line address of a transactional load operation has been registered with L2 cache 230 during a given memory transaction, it is unnecessary to again register the same target cache line address with L2 cache 230 during the same memory transaction. Because it is common for a memory transaction to include multiple transactional load requests targeting the same cache line, in some implementations, a processor core 200 could send multiple redundant TM LDA requests to register the same target cache line address with TM tracking logic 381 of L2 cache 230. However, in a preferred embodiment, each processor core 200 includes a transactional memory load directory (e.g., TM LD Dir 204) that filters out the transmission of redundant TM LDA requests based on the target cache line addresses of the last N transactional load requests that have hit in L1 cache 226. A replacement mechanism such as LRU 206 (or in a simpler embodiment a first-in, first-out (FIFO) queue) can be used to keep a list of the cache lines most recently referenced by transactional load operations fresh in TM LD Dir 204.

Figure 7:
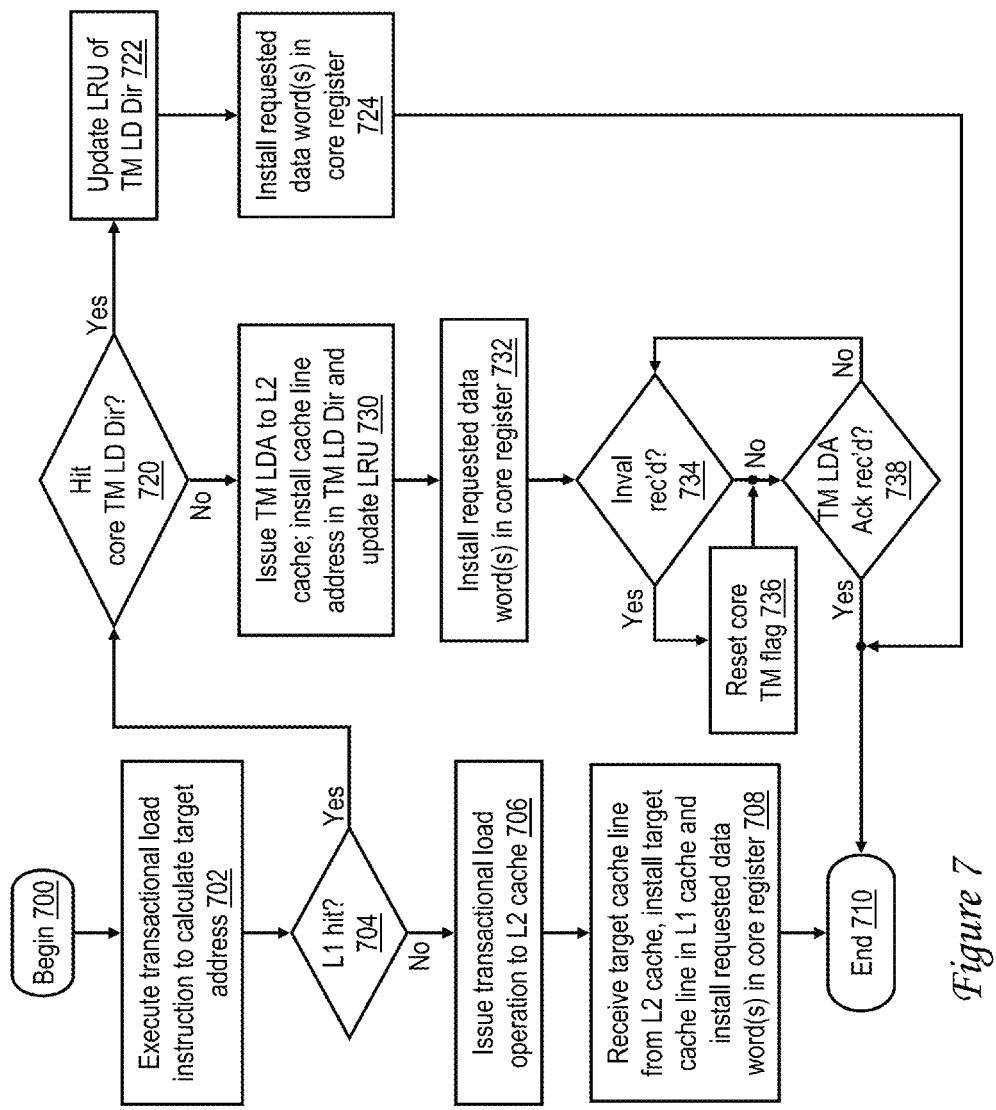
FIG. 7 is a high level logical flowchart of an exemplary method by which a processor core of a multiprocessor data processing system processes a transactional load instruction in accordance with one embodiment.

With reference now to FIG. 7, there is depicted a high level logical flowchart of an exemplary method by which a processor core 200 of data processing system 100 processes a transactional load instruction in accordance with an embodiment of the present invention. As shown, the process begins at block 700 and thereafter proceeds to block 702, which illustrates LSU 202 of processor core 200 receiving a transactional load instruction and then executing the transactional load instruction to calculate a load target address.

Following execution of the transactional load instruction to determine the load target address, processor core 200 accesses the directory of L1 cache 226 using the load target address to determine whether a cache line containing the data word(s) associated with the load target address resides in (i.e., whether the load target address "hits") L1 cache 226 (block 704). If not, L1 cache 226 signals a cache miss, and processor core 200 responds by issuing a transactional load (TM LD) operation to an RC machine 312 in L2 cache 230, as shown at block 706.

Following issuance of the TM LD operation to L2 cache 230, processor core 200 receives the cache line of data identified by the load target address of the TM LD operation from L2 cache 230. In response to receipt of the target cache line, processor core 200 installs the entire cache line of data in L1 cache 226 and transfers the specific data word(s) requested by the transactional load instruction into core register(s) within register file 208 (block 708). Thus, unlike some prior art processors that only load the specifically requested data word(s) into core register(s) and do not cache the entire target cache line, processor core 200 of data processing system 100 preferably establishes the entire target cache line in L1 cache 226 to permit subsequent loads, and particularly subsequent transactional loads, to hit in L1 cache 226. Thereafter, the process terminates at block 710.

Returning to block 704, if processor core 200 determines that the load target address hit in L1 cache 226, processor core 200 additionally determines at block 720 whether the target cache line address hits in TM LD Dir 204, indicating that a TM LDA operation has been sent to TM tracking logic 381 of L2 cache 230 in order to register the target cache line address as part of the transaction footprint of the current memory transaction. If so, processor core 200 need not again register the target cache line address with TM tracking logic 381. Accordingly, in response to an affirmative determination at block 720, the process passes to block 722, which illustrates processor core 200 refraining from transmitting a TM LDA operation to L2 cache 230 and instead simply updating LRU 206 of TM LD Dir 204 to reflect the access to the target cache line. As shown at block 724, processor core 200 also installs the specific data word(s) requested by the transactional load into one or more core register(s) within register file 208. Thereafter, the process of FIG. 7 ends at block 710.

Returning to block 720, in response to a determination that the target cache line address of the TM LD operation misses in TM LD Dir 204, processor core 200 issues an address-only TM LDA operation to L2 cache 230 to inform TM tracking logic 381 of L2 cache 230 that the transactional load operation has speculatively bound to a (potentially stale) value in L1 cache 226 (block 730). Thus, the TM LDA operation requests no return of data. As further illustrated at block 730, processor core 200 installs the target cache line address in TM LD Dir 204 (performing any required eviction by reference to LRU 206) and updates LRU 206 to reflect access to the target cache line. In addition, as shown at block 732, processor core 200 installs the specific data word(s) requested by the transactional load into one or more core register(s) within register file 208.

During a core TM tracking interval beginning when the load target address of the transactional load request hits in L1 cache 226, processor core 200 continuously monitors for receipt from the associated L2 cache 230 of any invalidation message 386 that invalidates the target cache line from which processor core 200 accessed possibly stale data in response to the transactional load (block 734). In addition, processor core 200 continuously monitors for receipt from L2 cache 230 of a LDA ACK message, which signifies that TM tracking logic 381 of L2 cache 230 has assumed responsibility for tracking the target cache line address of the transactional load (block 738). In response to receipt of an invalidation message 386 from L2 cache 230 that specifies the target cache line address for which processor core 200 is monitoring during the core TM monitoring interval, processor core 200 resets core TM flag 212 to indicate that the memory transaction should fail (block 736).

As indicated by the loop from block 738 back to block 734, processor core 200 continues monitoring for an invalidation message 386 until processor core 200 determines at block 738 that a TM LDA Ack message is received from TM tracking logic 381 of L2 cache 230. In response to a determination at block 738 that a TM LDA Ack message has been received, the core TM tracking interval ends, and the process of FIG. 7 ends at block 710.

Figure 8:
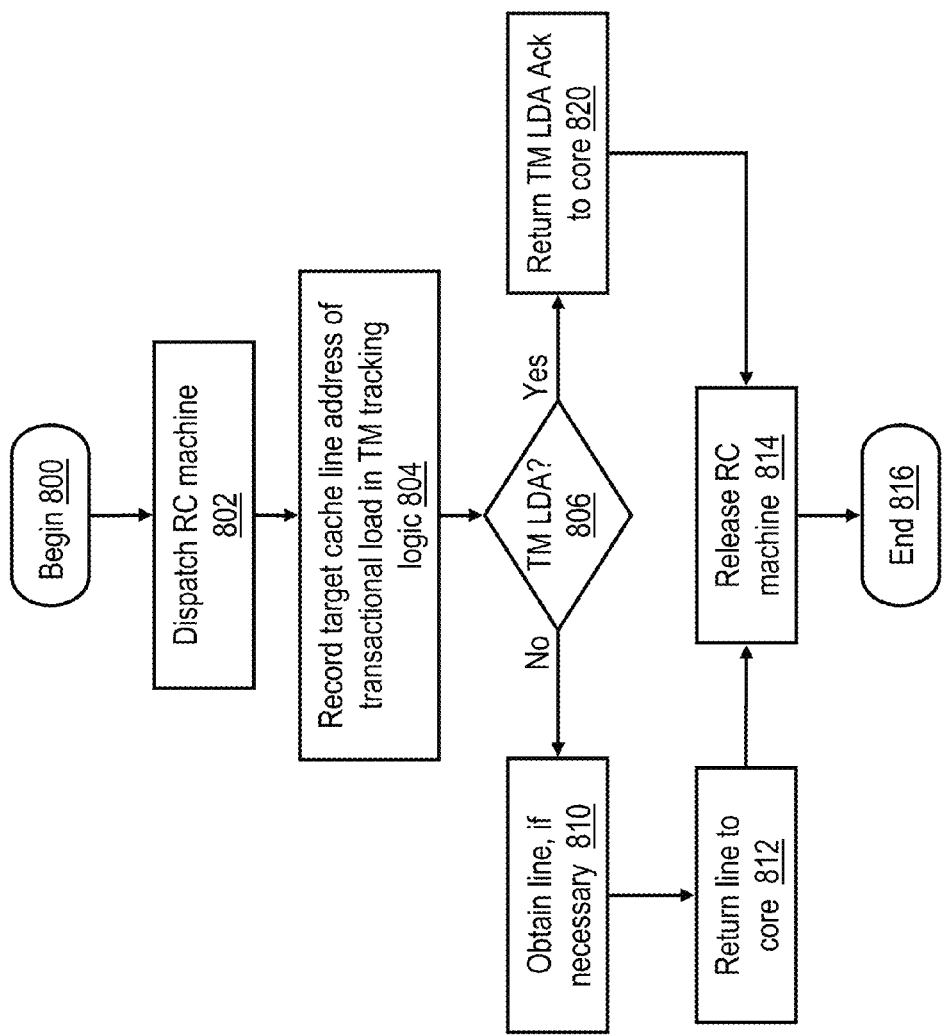
FIG. 8 is a high level logical flowchart of an exemplary method by which a lower level cache memory of a multiprocessor data processing system processes a transactional load operation in accordance with one embodiment.

With reference now to FIG. 8, there is illustrated a high level logical flowchart of an exemplary method of processing transactional load operations in a lower level cache in accordance with the present invention. The illustrated process begins at block 800 in response to a lower level cache memory, such as an L2 cache 230, receiving a transactional load operation (e.g., a TM LD or TM LDA) operation from an affiliated processor core 200. In response to receipt of the transactional load operation, L2 cache 230 dispatches an RC machine 312 to service the transactional load operation (block 802). In a preferred embodiment, the RC dispatch logic of L2 cache 230 represents a point of serialization of transactional load and store operations with respect to snooped operations in that L2 cache 230 defers dispatch of the RC machine 312 until deallocation of any snoop machine 311 then allocated to service a snooped operation targeting the same cache line as the transactional load operation. And in a similar fashion, the presence of an RC machine 312 servicing a transactional load or operation defers dispatch of a snoop machine 311 to service a snooped operation targeting the same cache line as the transactional load operation until deallocation of the RC machine 312. TM tracking logic 381 of L2 cache 230 additionally records the target cache line address of the transactional load operation as part of the transaction footprint of the current memory transaction (block 804).

Once dispatched, RC machine 312 determines at block 806 whether the transactional load operation is a TM LDA operation. If not (i.e., the transactional load operation is a TM LD operation that requests return of the target cache line of data), the process proceeds to block 810, which illustrates the RC machine 312 allocated to service the TM LD operation obtaining the target cache line of data from the L2 cache array 302 or, if the target cache line address misses in L2 directory 308, system memory 108 or another processing unit 104. Following block 810, RC machine 312 returns the target cache line to processor core 200 (block 812). Thereafter, L2 cache 230 releases the RC machine 312 allocated to service the TM LD operation (block 814), and the process of FIG. 8 ends at block 816.

Returning to block 806, in response to a determination by RC machine 312 that the transactional load operation received from processor core 200 is a TM LDA operation, the process proceeds to block 416, which illustrates RC machine 312 returning a TM LDA Ack message 372 to processor core 200. In a preferred embodiment, L2 cache 230 serializes invalidation messages 386 transmitted to processor core 200 by snoop machines 311 and LDA ACK messages 372 transmitted by RC machines 312 in order to ensure that such messages are received by processor core 200 in the same relative order that RC machines 312 and snoop machines 311 gain control of the target cache line of a transactional load operation. Following block 820, the process of FIG. 8 passes to block 814-816, which have been described.

Figure 9:
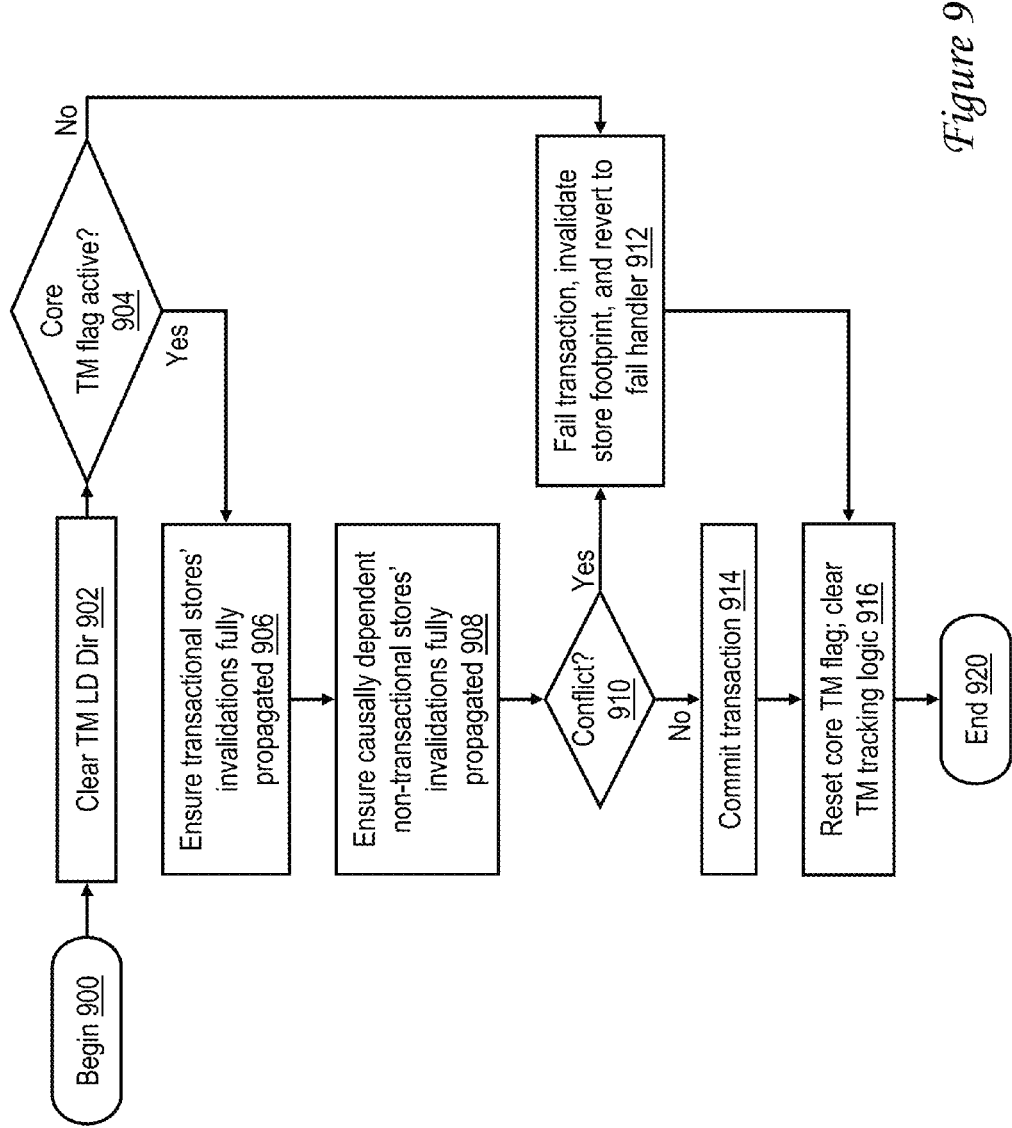
FIG. 9 is a high level logical flowchart of an exemplary method by which a multiprocessor data processing system commits or fails a memory transaction in accordance with one embodiment.

Referring now to FIG. 9, there is depicted a high level logical flowchart of the processing of a tend instruction terminating a memory transaction in accordance with one embodiment. The process begins at block 900, for example, in response to initiation of execution of a tend instruction within the LSU 202 of a processor core 200. The process of FIG. 9 proceeds from block 900 to block 902, which depicts processor core 200 clearing TM LD Dir 902. Processor core 200 further determines at block 904 whether or not TM flag 212, which was set to an active state by the tbegin instruction that initiated the memory transaction, is still in an active state. If a determination is made at block 904 that TM flag 212 is not in an active state, meaning that processor core 200 received an invalidation message 386 that invalidated the target cache line address of a TM load operation during the associated core TM monitoring interval, the process passes to block 912, which is described below. If, on the other hand, processor core 200 determines at block 904 that TM flag 212 is still active, meaning that processor core 200 did not receive an invalidation message 386 that invalidated the target cache line address of a TM load operation during any core TM monitoring interval of the current memory transaction, the process proceeds to block 906.

Block 906 depicts ensuring that the cache line invalidations necessitated by transactional stores within the memory transaction have been fully propagated throughout the distributed shared memory system. In the embodiment described above, verification of propagation of the cache line invalidations necessitated by transactional stores is accomplished by one or more snoop machines 311 providing a retry response to any applicable TEND request on local interconnect 114 until the previous transactional stores have invalidated all cached copies of the memory location(s) targeted by the memory updates. The process then proceeds to step 908, which illustrates ensuring that the cache line invalidations necessitated by causally dependent non-transactional stores have completely propagated throughout the distributed shared memory system. In the embodiment described above, verification of propagation of the cache line invalidations necessitated by non-transactional stores is accomplished by one or more instances of causality resolution logic 379 providing a retry response to any applicable TEND request on local interconnect 114 until the previous memory updates of causally dependent non-transactional stores have invalidated all cached copies of the memory location(s) targeted by the memory updates.

At block 910, transactional control logic 382 of L2 cache 230 determines whether or not a conflict has occurred for the memory transaction in accordance with the conflict policy implemented by transactional control logic 382. In response to transactional control logic 382 determining that a conflict has occurred, the process proceeds to block 912, which depicts transactional control logic 392 invalidating the tentative store footprint of the memory transaction (e.g., as recorded in L2 cache 230) and indicating via pass/fail indication 384 that the memory transaction has failed. As further illustrated at block 912, in response to pass/fail indication 384 processor core 200 updates its condition code register and transfers control to the fail handling branch instruction within the memory transaction. The process then passes to block 916, which is described below.

Returning to block 910, in response to transactional control logic 382 determining that no conflict has occurred during execution of the memory transaction, the process proceeds to step 914, which depicts TM control logic 382 committing the transaction, inter alia, by causing the transaction footprint to be committed to the distributed shared memory system (e.g., by updating one or more coherence states in the directory 308 of L2 cache 230 to indicate the transaction footprint is valid and available for access by all threads) and indicating to processor core 200 via pass/fail indication 384 that the memory transaction passed. Finally, at block 916, processor core 200 resets TM flag 212 in response to the pass/fail indication 384, and L2 cache 230 clears the cache line addresses from TM tracking logic 381. The process of FIG. 9 thereafter terminates at block 920.

Figure 10:
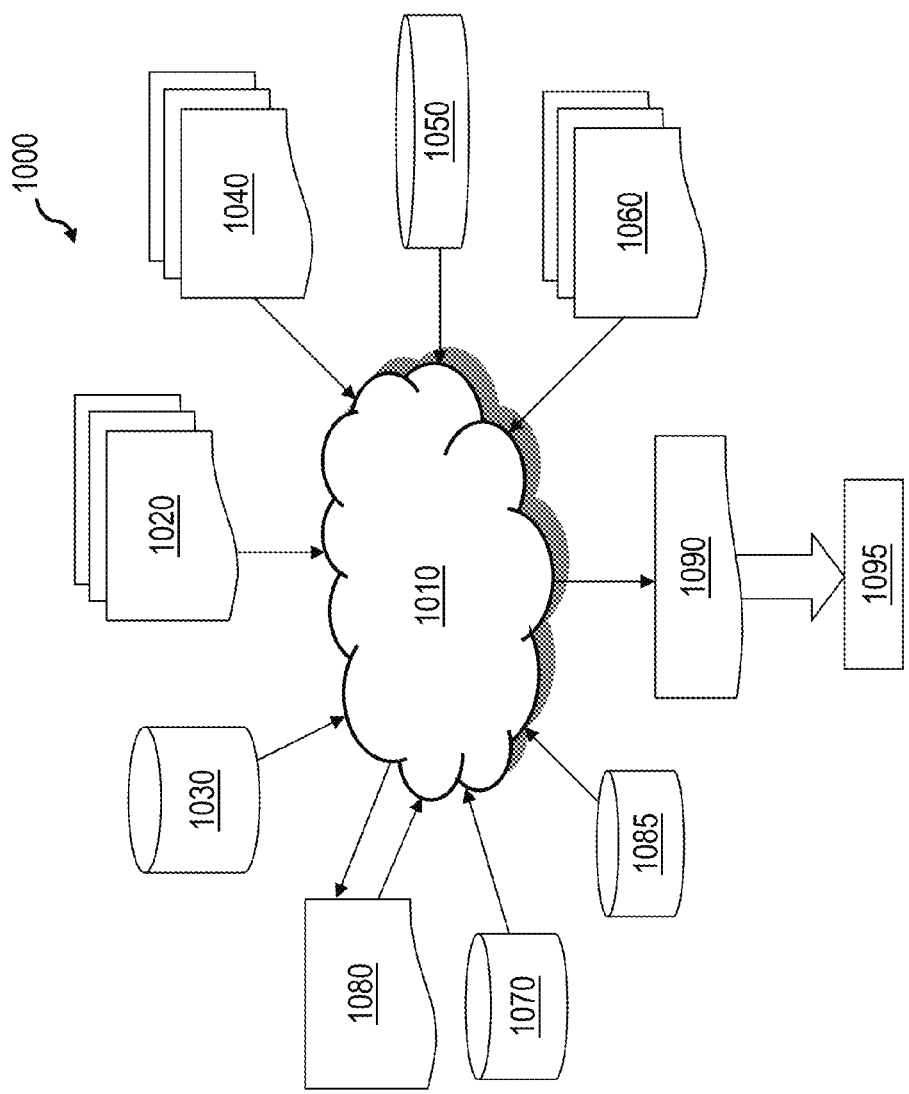
FIG. 10 is a data flow diagram illustrating a design process.

With reference now to FIG. 10, there is depicted a block diagram of an exemplary design flow 1000 used for example, in semiconductor IC logic design, simulation, test, layout, and manufacture. Design flow 1000 includes processes, machines and/or mechanisms for processing design structures or devices to generate logically or otherwise functionally equivalent representations of the design structures and/or devices described above and shown in FIGS. 1-3 and 6. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1010. Design structure 1020 may be a logical simulation design structure generated and processed by design process 1010 to produce a logically equivalent functional representation of a hardware device. Design structure 1020 may also or alternatively comprise data and/or program instructions that when processed by design process 1010, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1010 to simulate or otherwise functionally represent an electronic component, circuit, electronic or logic module, apparatus, device, or system such as those shown in FIGS. 1-3 and 6. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1010 preferably employs and incorporates hardware and/or software modules for synthesizing, translating, or otherwise processing a design/simulation functional equivalent of the components, circuits, devices, or logic structures shown in FIGS. 1-3 and 6 to generate a netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1010 may include hardware and software modules for processing a variety of input data structure types including netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1040, characterization data 1050, verification data 1060, design rules 1070, and test data files 1085 which may include input test patterns, output test results, and other testing information. Design process 1010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1010 without deviating from the scope and spirit of the invention. Design process 1010 may also include modules for performing standard circuit design processes such as timing analysis, verification, design rule checking, place and route operations, etc.

Design process 1010 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3 and 6. In one embodiment, design structure 1090 may comprise a compiled, executable HDL simulation model that functionally simulates the devices shown in FIGS. 1-3 and 6.

Design structure 1090 may also employ a data format used for the exchange of layout data of integrated circuits and/or symbolic data format (e.g., information stored in a GDSII (GDS2), GL1, OASIS, map files, or any other suitable format for storing such design data structures). Design structure 1090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3 and 6. Design structure 1090 may then proceed to a stage 1095 where, for example, design structure 1090: proceeds to tape-out, is released to manufacturing, is released to a mask house, is sent to another design house, is sent back to the customer, etc.

As has been described, in at least one embodiment, a processing unit for a multiprocessor data processing system includes a processor core including a store-through upper level cache, an instruction execution unit, and a flag. In response to execution in a memory transaction of a transactional load instruction that speculatively binds to a value held in the store-through upper level cache, the processor core sets the flag, transmits a transactional load operation to a store-in lower level cache that tracks a target cache line address of a target cache line containing the value, monitors, during a core TM tracking interval, the target cache line address for invalidation messages from the store-in lower level cache until the store-in lower level cache signals that the store-in lower level cache has assumed responsibility for tracking the target cache line address, and responsive to receipt during the core TM tracking interval of an invalidation message indicating presence of a conflicting snooped operation, resets the flag. At termination of the memory transaction, the processor core fails the memory transaction responsive to the flag being reset.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes propagating signals per se and transmission media per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a multiprocessor data processing system, said processing unit comprising:
a processor core including a store-through upper level cache, an instruction execution unit, and a flag;
wherein the processor core is configured to:
responsive to the instruction execution unit executing, in a memory transaction, a transactional load instruction that speculatively binds to a value held in the store-through upper level cache:
set the flag;
transmit a transactional load operation to a store-in lower level cache that tracks a target cache line address of a target cache line containing the value;
monitor, during a core transactional memory tracking interval, the target cache line address for invalidation messages from the store-in lower level cache until the store-in lower level cache signals that the store-in lower level cache has assumed responsibility for tracking the target cache line address;
responsive to receipt during the core transactional memory tracking interval of an invalidation message indicating presence of a conflicting snooped operation, reset the flag; and
at termination of the memory transaction, fail the memory transaction responsive to the flag being reset.

2. The processing unit of claim 1, wherein the core transactional memory tracking interval is a variable length interval that begins in response to said transactional load instruction speculatively binding to the value held in the store-through upper level cache and ends in response to receipt from said store-in lower level cache of an acknowledgement message indicating that the store-in lower level cache has assumed responsibility for tracking the target cache line address.

3. The processing unit of claim 1, wherein the processor core is configured to:
responsive to the transactional load instruction not binding in the store-through upper level cache, refrain from setting the flag and from monitoring the target cache line address.

4. The processing unit of claim 1, and further comprising the store-in lower level cache.

5. The processing unit of claim 4, wherein said lower level cache includes transactional memory logic, including:
transactional memory tracking logic that, responsive to the transactional load operation, tracks the target cache line address; and
transactional memory control logic that, responsive to the transactional memory tracking logic detecting a conflicting access to the target cache line address, transmits to the processor core a fail indication indicating that the memory transaction failed.

6. The processing unit of claim 5, wherein:
the transactional load operation is an address-only transactional load operation that does not request return of data; and
the transactional memory logic signals that the store-in lower level cache has assumed responsibility for tracking the target cache line address by transmitting an acknowledgement in response to receipt of the address-only transactional load operation.

7. The processing unit of claim 6, wherein:
the processor core further includes a transactional memory load directory by which the processor core filters transmission of address-only transactional load operations to the store-in lower level cache.

8. A data processing system, comprising:
a system fabric;
a system memory coupled to the system fabric; and
a plurality of processing units coupled to the system fabric, the plurality of processing units including at least one processing unit including a processor core including a store-through upper level cache, an instruction execution unit, and a flag;
wherein the processor core is configured to:
responsive to the instruction execution unit executing, in a memory transaction, a transactional load instruction that speculatively binds to a value held in the store-through upper level cache:
set the flag;
transmit a transactional load operation to a store-in lower level cache that tracks a target cache line address of a target cache line containing the value;
monitor, during a core transactional memory tracking interval, the target cache line address for invalidation messages from the store-in lower level cache until the store-in lower level cache signals that the store-in lower level cache has assumed responsibility for tracking the target cache line address;
responsive to receipt during the core transactional memory tracking interval of an invalidation message indicating presence of a conflicting snooped operation, reset the flag; and
at termination of the memory transaction, fail the memory transaction responsive to the flag being reset.

9. A design structure tangibly embodied in a machine-readable storage device for designing, manufacturing, or testing an integrated circuit, the design structure comprising:
a processing unit for a data processing system including a shared memory system, the processing unit including:
a processor core including a store-through upper level cache, an instruction execution unit, and a flag;
wherein the processor core is configured to:
responsive to the instruction execution unit executing, in a memory transaction, a transactional load instruction that speculatively binds to a value held in the store-through upper level cache:
set the flag;
transmit a transactional load operation to a store-in lower level cache that tracks a target cache line address of a target cache line containing the value;
monitor, during a core transactional memory tracking interval, the target cache line address for invalidation messages from the store-in lower level cache until the store-in lower level cache signals that the store-in lower level cache has assumed responsibility for tracking the target cache line address;
responsive to receipt during the core transactional memory tracking interval of an invalidation message indicating presence of a conflicting snooped operation, reset the flag; and
at termination of the memory transaction, fail the memory transaction responsive to the flag being reset.

10. The design structure of claim 9, wherein the core transactional memory tracking interval is a variable length interval that begins in response to said transactional load instruction speculatively binding to the value held in the store-through upper level cache and ends in response to receipt from said store-in lower level cache of an acknowledgement message indicating that the store-in lower level cache has assumed responsibility for tracking the target cache line address.

11. The design structure of claim 9, wherein the processor core is configured to:
   responsive to the transactional load instruction not binding in the store-through upper level cache, refrain from setting the flag and from monitoring the target cache line address.

12. The design structure of claim 9, and further comprising the store-in lower level cache.

13. The design structure of claim 12, wherein said lower level cache includes transactional memory logic, including:
   transactional memory tracking logic that, responsive to the transactional load operation, tracks the target cache line address; and
   transactional memory control logic that, responsive to the transactional memory tracking logic detecting a conflicting access to the target cache line address, transmits to the processor core a fail indication indicating that the memory transaction failed.

14. The design structure of claim 13, wherein:
   the transactional load operation is an address-only transactional load operation that does not request return of data; and
   the transactional memory logic signals that the store-in lower level cache has assumed responsibility for tracking the target cache line address by transmitting an acknowledgement in response to receipt of the address-only transactional load operation.

* * * * *